Aug. 7, 1945.        M. TAMA ET AL        2,381,523
SUBMERGED RESISTOR TYPE INDUCTION FURNACE
Original Filed Dec. 31, 1943    4 Sheets-Sheet 1
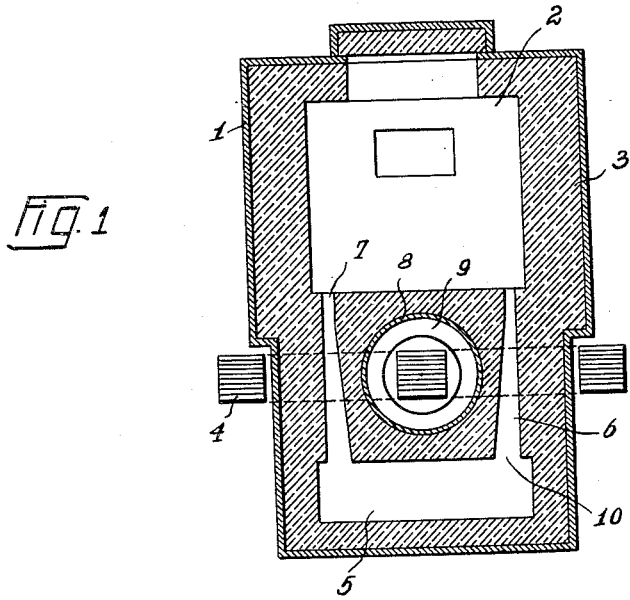
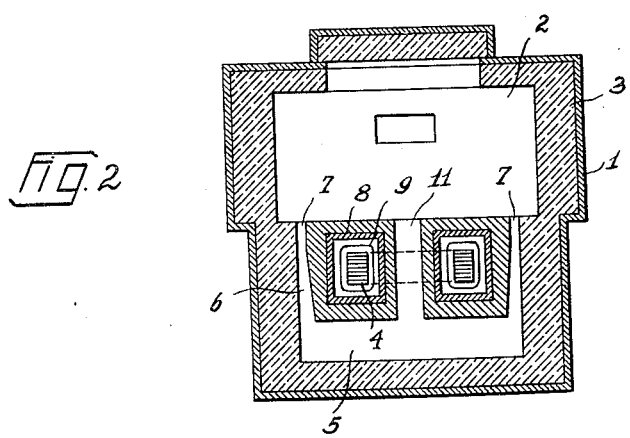
INVENTOR.
Manuel Tama
Mario Tama
BY
E. Freeman
ATTORNEY.

Aug. 7, 1945.     M. TAMA ET AL     2,381,523

SUBMERGED RESISTOR TYPE INDUCTION FURNACE

Original Filed Dec. 31, 1943    4 Sheets-Sheet 2

INVENTOR.

Aug. 7, 1945.    M. TAMA ET AL    2,381,523
SUBMERGED RESISTOR TYPE INDUCTION FURNACE
Original Filed Dec. 31, 1943    4 Sheets-Sheet 3
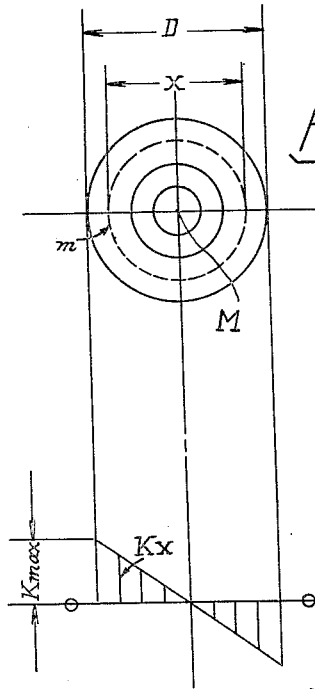
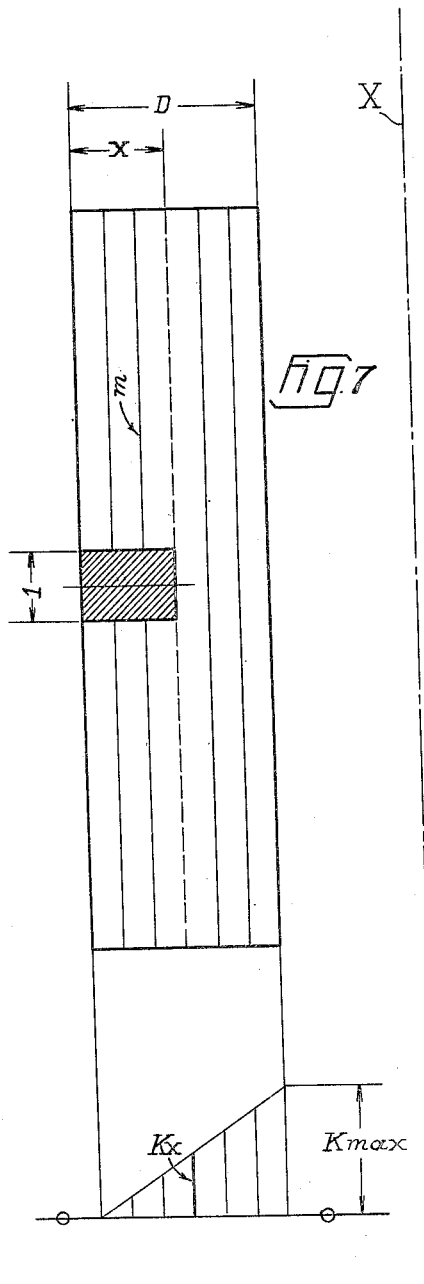
INVENTOR.
BY
ATTORNEY.

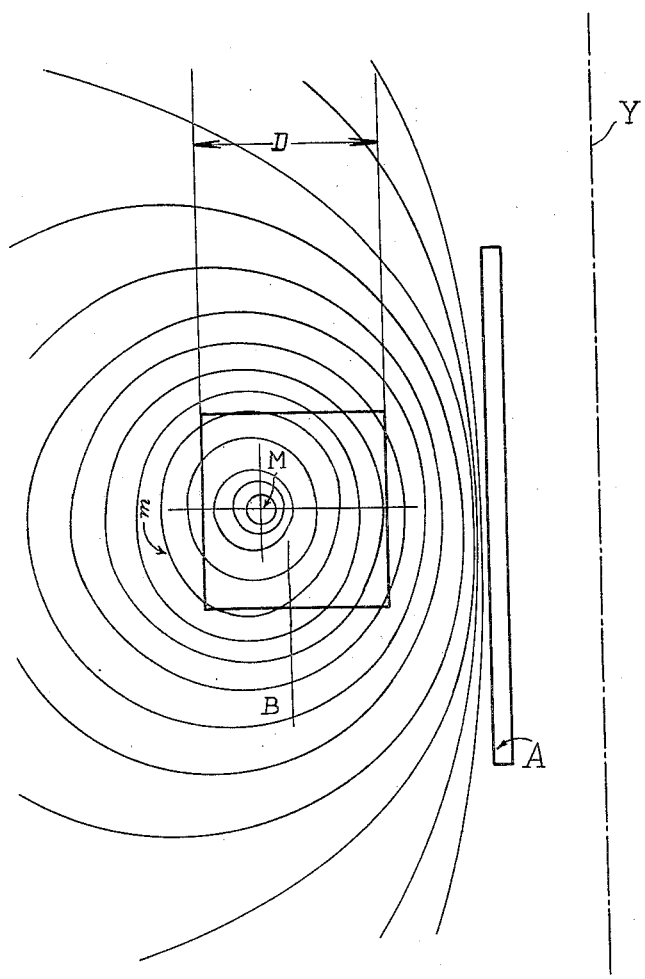

Patented Aug. 7, 1945

2,381,523

UNITED STATES PATENT OFFICE 2,381,523

SUBMERGED RESISTOR TYPE INDUCTION FURNACE

Manuel Tama and Mario Tama, Morrisville, Pa., assignors to Ajax Engineering Corporation, Trenton, N. J.

Original application December 31, 1943, Serial No. 516,518, now Patent No. 2,375,049, dated May 1, 1945. Divided and this application November 3, 1944, Serial No. 561,756

15 Claims. (Cl. 13—29)

The invention is a division of our copending patent application Ser. No. 516,518, filed December 31, 1943, which has become Patent No. 2,375,049; it relates to an induction furnace of the submerged resistor type for melting metals.

A primary object of the invention is to obtain superior metallic products which are free from slag inclusions.

Another object of the invention is to separate the slags particularly from molten metals of low specific gravity, such as aluminum, magnesium and alloys thereof.

Also an object of the invention is to obtain the separation of the slags from the molten metal in a quick and effective manner.

Another object of the invention is to effect the separation of the slags from the molten metals at places and zones of the melting channels which are easily accessible by cleaning tools from above, but to prevent the accumulation of the slags in parts of the furnace which are only accessible with difficulty.

It is another important object of the invention to so force the slags in the easily accessible zones of the melting channels against the channel walls that they adhere to the same as a coherent paste.

It is an important object of the invention to insure a continuous operation of submerged resistor type induction furnaces.

It is, therefore, also an object of the invention to avoid stoppages of the furnace operation and drainage of the furnace for the removal of the slags.

The physical principles upon which the invention is based, are the following:

When an electric current of a high density is forced to pass through a conductor—molten or solid—it creates a magnetic field within the conductor and outside of it. Only the field within the conductor produces forces beneficial for carrying out the invention.

The shape of this magnetic field is substantially the same when direct current or alternating current is used. By the combined effect of the current elements flowing through the conductor and the magnetic field elements cutting through said current elements, internal forces are created within the conductor.

If the conductor is a molten metal, electromagnetic pressure gradients are established within the conductor with zones of high pressure at certain places and zones of low pressure at other places. The forces are directed towards the centers of the magnetic field and the direction of the forces can be determined by the well known three-finger rule. If alternating current is used, the direction of the forces is not changed when the current is reversed. Therefore, the pressure gradients created within the molten metal are always maintained in a definite direction during the entire process.

When non-conductive slag-particles are contained in the molten metal, the electromagnetic pressure gradients are only created in the molten metal surrounding the slag particles, while no forces are created inside the slag particles. The result is that the slag particles are pressed towards the zones of low hydrostatic pressure, in a direction opposite to the direction of the forces acting on the conducting liquid. The electromagnetic pressure gradients which can be created by the method here described may be about hundred times larger than those existing in a quiet mass of molten metal subjected only to gravity action.

The separation of slags from heavy metals, as for instance silicon steel, by the application of pressure gradients resulting from the combined action of a current passed through the molten silicon steel and the magnetic fields created thereby has already been suggested for open-ring induction furnaces where the primary coil is located above a ring of molten metal. The slag particles are expelled to the surface of the bath and removed therefrom. The instant invention, however, is not concerned with open-ring type induction furnaces.

Besides, the forced flow of the melt to the surface of the bath causes movements with incumbent infiltration of air and oxidation, which is particularly harmful when easily oxidizable and light metals are molten.

It is also known to separate slags from molten metals by the combined forces created by the current passing through the molten mass and electro-magnetic fields produced by sources other than those normally produced by said current. The devices used in this known process for creating the external magnetic fields are either magnetic shields or solenoids, located outside of the lining holding the molten metal to be processed.

Furthermore, a separation of metal and slag and the expulsion of the same from the furnace has been attempted by the establishment of two electromagnetic fields orientated to each other under certain specific conditions. In this case current is directly conducted into the molten metal.

The invention relates to an induction furnace of the submerged resistor type, such as for instance described and claimed in U. S. Patent No. 2,339,964 of Manuel Tama, U. S. Patent No. 2,342,617, of Manuel Tama and Mario Tama, U. S. Patent No. 2,347,298, Re. 22,602 of Mario Tama.

The furnaces described in these patents are provided with two types of melting channels so arranged that the flow direction of the molten conductor from the one type channel into the second type channel and from the latter into the first type of melting channel is abruptly changed. The first type channels extend substantially vertical, and the second type channels extend substantially horizontal. The provision of these two types of channels is not novel as such, in induction furnaces, but they form, as afterwards explained, the basis for the instant invention which is not applicable to the customary one channel furnaces having a single curved continuous melting channel sometimes of equal, sometimes of gradually increasing and sometimes of gradually decreasing cross area extending from the one to the other hearth entering end.

In order to evaluate the forces and pressure gradients used in carrying out the invention, two extreme cases will be considered which are illustrated in attached Figs. 5 to 8.

Case 1 signifies a long conductor of circular cross-section carrying a heavy current with the return conductor at a considerable distance away, in which case the center of the magnetic field coincides with the geometric center of the circle.

The magnetic lines of force are concentric circles around the geometric center M, Fig. 5. The field intensity at the center is zero and has a maximum value at the periphery. The highest electromagnetic pressure is created at the center and the lowest at the periphery. The forces are directed radially towards the center.

Case 2 signifies an infinitely long cylindrical coil creating a homogeneous magnetic field in the cylindrical space it surrounds.

The magnetic lines of force are parallel to the axis of the coil. The field intensity is zero at the outside layers of the coil and has a maximum value at the inside layers. The highest electromagnetic pressure is created at the outside layers and the lowest at the inside layers. Non-conductive slag particles will, therefore, be deposited against the inside layers. The forces are directed radially towards the outside layers.

The conditions existing in the melting channels of the submerged resistor type of induction furnaces lie between the extreme cases just discussed, as will be shown hereafter.

The internal forces produced by the mutual action of electric current and magnetic fields in the manner described above, can be calculated from the equation $$K = 0.125 \, j.H \quad (1)$$

wherein $0.125 = 4\mu.10^{-2}$
$K =$ force in dyn./cm.$^3$
$j =$ current density in amp./cm.$^2$
$H =$ field intensity in amp./cm.

Equation 1 will now be applied to the two extreme cases recited above, under the assumption that the current density $j$ is uniform over the entire cross section of the conductor, a condition which is usually encountered if the cross-section of the conductor is not too large.

Case 1.—In a long conductor of circular cross-section the field intensity at the geometric center is equal to zero (see Figures 5 and 6). The field intensity at the layer of a circle having the diameter $x$ will be $$Hx = \frac{j.x}{4} \quad (2)$$

By inserting Equation 2 in Equation 1 we find the force per unit of volume acting on all elements located on a circle with the diameter $x$:

$$Kx = 0.125.j^2.\frac{x}{4} \quad (3)$$

In the outside layers of the circular conductor the force is $$K_{max} = 0.125.j^2.\frac{D}{4} \quad (4)$$

Fig. 5 shows a cross section of the conductor with the field lines $m$, and Figure 6 shows the distribution of the forces over the cross section.

Case 2.—In an infinitely long cylindrical coil having a radial thickness D, the forces can be calculated by writing the equations for an element of unity of length, (see Figure 7). The field intensity in a layer located at a distance $x$ from the outside of the conductor is:

$$HX = X.j \quad (5)$$

By inserting Equation 5 into Equation 1 we find:

$$Kx = 0.125.x \quad (6)$$

At the inside layer we find the maximum force per unit of volume:

$$K_{max} = 0.125.j^2.D \quad (7)$$

Figure 7 shows a cross section of the conductor with the field lines $m$, and Figure 8 shows the distribution of the forces over the cross section.

In comparing Equation 4 with Equation 7 it will be seen that, under similar conditions, viz. equal current density and equal thickness of the conductor, the maximum force created at the inside layers is four times larger in Case 2 than in Case 1.

The conditions existing in the channels of submerged resistor type induction furnaces lie between the two extreme cases just calculated. Figure 9 shows the primary coil A, the secondary conductor B of square cross section, the center line Y of primary and secondary and the stray fields $m$ surrounding the secondary and cutting it. The zero point M of the field is located inside of the secondary but not in its center, as in Case 1. It is also more inside of the conductor B than in Case 2. The values of maximum forces will, therefore, lie between those given by Equations 4 and 7. The forces created in an assembly according to Figure 9 cannot be determined by analytic means; but they may be calculated by graphical integrations, after measuring and plotting the intensity of the stray field.

However, it is not necessary to enter deeper into this complicated procedure, because the current density and the thickness or cross area of the conductor are the determining factors, and it is possible to formulate a simple rule in order to obtain the benefits of the method steps called for by the present invention, as will be shown shortly hereafter.

Based on the above described principles the invention mainly resides in the provision of two type melting channels which act differently towards the slag particles suspended in the molten conductor and transported by its flow force through these channels.

The first channel type which preferably extends in a substantially vertical direction has a strongly reduced cross area in comparison with the second type channel which preferably extends in a substantially horizontal direction. The reduced cross area is provided in a part or zone of the first type melting channels which is easily accessible by cleaning tools from above and is preferably located in the upper end section of the channels. Due to the difference of the cross area in those two types of melting channels electromagnetic pressure gradients are created in the first named channel type of such magnitude that the slags suspended in the molten conductors are forced out of the same and pressed against the channel walls to which they strongly adhere; here they form a coherent paste and can be easily removed by the insertion of cleaning tools from above; the furnace remains filled with the molten charge and no interruption occurs of its operation.

In the second type channel the cross area is so enlarged in comparison to the first type channels and the electromagnetic pressure gradients therefore are so small that they are overcome by the flow force of the molten conductor, therefore slags do not adhere to the channel walls, but are conducted into the first type channels where they are trapped and pressed against the walls, as described in the foregoing.

From the above given explanation it is obvious that submerged resistor type induction furnaces provided with one continuous melting channel even having gradually decreasing or gradually increasing cross areas cannot be used for the performance of the invention as the provision of two types of melting channels having an abruptly changed flow direction and a different cross area is a prerequisite of the invention.

The sizes of the cross areas of the two types of melting channels are apparent from the previously given theoretical deductions and can be easily determined if the following rules are applied.

Referring now again to Equations 4 and 7 which show that the pressure gradients are proportional to the product $j^2.D$ of current density and thickness of the conductor, it was found that a particularly satisfactory concentration of the slag particles may be obtained in the melting channels of the furnace, if this product is essentially equal to or larger than $3 \times 10^6$ and that the slag deposits do not occur if the said product is equal to or less than $0.7 \times 10^6$.

If the cross area of the conductor is circular, D represents its diameter; if the cross-section is not circular, D represents the diameter of a circle having the same area as the non-circular conductor, or in other words, the cross area of the circle to which the non-circular cross area is reduceable; for the sake of simplicity D will henceforth be called "reduced diameter."

The following examples will serve to further illustrate the use of this simplified rule:

*Example 1*

In a furnace similar to the one shown in Figure 2, the two lateral vertical channels of circular cross-section have a diameter of 5 cm. and carry a current of 17,500 amps. each; the product $j^2.D$ is $4 \times 10^6$; the slag particles are pressed to the walls on this tubular channel and can be easily removed therefrom.

The central vertical channel of the same furnace has a rectangular cross section of 5 cm. $\times$ 10 cm. and carries a current of 35,000 amps.; the product $j^2.D$ is $3.1 \times 10^6$. The intensity of the slag deposition is slightly reduced in comparison to the two lateral channels.

The bottom channel of the same furnace has a rectangular cross section of 7½ cm. $\times$ 10 cm. and carries a current of 17,500 amps.; the product $j^2.D$ is equal to $0.53 \times 10^6$. No slag deposition took place in this bottom channel after a continuous operation of the furnace of more than 6 months.

*Example 2*

In a furnace similar to the one shown in Fig. 1, the vertical channels have a cross-section of 6.7 cm. $\times$ 6.7 cm. and carry a current of 31,000 amps. The product $j^2.D$ is equal to $3.6 \times 10^6$. A satisfactory deposition and adherence of the slag particles results on the walls of the vertical channels.

The bottom channel of the same furnace consists of two superposed parts; the upper one having a rectangular cross-section of 6.4 cm. $\times$ 7.5 cm. above, and the lower one having a rectangular cross section of 7.5 cm. $\times$ 12.5 cm. The current carried by the conductor in this channel is 31,000 amps.; the product $j^2.D$ is equal to $0.64 \times 10^6$. No slag deposits occurred in this channel.

In computing these figures the current density should be expressed in amp./cm.$^2$ and the reduced diameter in centimeters. The current should correspond to the maximum power of the furnace. Inasmuch as the product $j^2.D$ does not give the exact amount of pressure gradient but is intended to be used only as a guide for the disposition of the melting channels, it is not necessary to attach any dimension to it. However, the following figures will demonstrate that very high pressures are necessary to obtain the effects described in the present invention.

In the vertical channels of the furnace referred to in Example 1, the maximum pressure gradients are 125,000 dyn./cm.$^3$ (or 127.5 gr./cm.$^3$), according to Equation 4, and 500,000 dyn./cm.$^3$ (or 510 gr./cm.$^3$) according to Equation 7. Inasmuch as the specific gravity of aluminum is 2.7 gr./cm.$^3$, the forgoing pressure gradients are from 47 to 188 times larger than those created by gravity action alone. The actual pressures existing in the melting channels of submerged resistor induction furnaces lie between these two magnitudes, as explained above.

Best results are obtained when the ratio of the cross-sectional area of the bottom channels to that of the vertical channels is approximately 3:1. If this rule is followed, the ratio of the electromagnetic pressures in the bottom channels to that of the vertical channels is approximately 1:5.

The progress due to this invention is particularly apparent in the melting of light metals in submerged resistor type induction furnaces. Up to the present time no induction furnaces of this type have been operated for the melting of these metals in a continuous manner.

Experiments carried out twenty years ago by one of the applicants in melting aluminum alloys in a standard induction furnace for brass revealed that the furnace could be kept in operation only from 3 to 4 hours. After breaking the furnace lining and inspecting the melting channels, it was discovered that the bottom parts of the channels had been completely contaminated with non-conductive oxides, which increased their resistance to such a degree that no power could be absorbed by the furnace; these trials were repeated several times and finally given up, because a continuous operation could not be obtained.

At a later date submerged resistor type induction furnaces for melting light metals were made with arcuated melting channels of very large cross-section. In order to keep these furnaces in operating condition it was necessary to discharge the molten metal from the furnace into the ladle, to remove the slags from the channels with flexible chains while the lining was hot and to charge the furnace again with the molten metal contained in the ladle. This, of course, was a serious disturbance of the melting operation, which required 20 to 30 minutes interruption of the melting process and had to be repeated at intervals ranging from 8 to 24 hours.

Further progress was made at a later date when the furnaces were provided with one or more removable plugs at the bottom for the purpose of cleaning the lower parts of the melting channels after the furnace was drained. But again a continuous operation was not obtained, because the charge had to be removed in order to proceed with the reconditioning of the furnace.

Following the teachings of the present invention it is possible to obtain the concentration and deposition of the slag particles at desired places within the molten bath which are easily accessible and to prevent this phenomenon at places where they are harmful for the operation and could only be removed with difficulty and after emptying the furnace.

The present furnace may be operated in a substantially continuous manner, using at all times the full power and interrupting the operation only for the purpose to charge and to discharge the metal.

Furnaces of the type described in the present application have been used for melting aluminum alloys in a continuous manner at different foundries in the United States for a period of from three to five months without the necessity of interruption for cleaning the bottom channels, whereas under the hitherto customary conditions the same furnace would have to be stopped after several hours of work.

The invention which renders it possible to continuously melt slag containing metals and particularly light metals and alloys in a submerged resistor type induction furnace, therefore, signifies an outstanding progress in the art.

Zones which answer the requirement of an efficient slag concentration and easy accessibility without drainage of the furnace are vertical or substantially vertical melting channels where pressure gradients of the here desired magnitude are created.

Under the action of these electromagnetic pressure gradients the non-conductive slag particles are pressed and pasted against the walls of these easily accessible sections of the melting channels where the greatest force $K_{max}$ is created. These zones of a maximum force correspond with those of maximum pressure gradients because the pressures are the integral of the forces and vice versa, the forces are the differentials of the pressures. It will be noted that the forces were expressed (Equation 1) in dyn./cm.$^3$ and that the pressures which are expressed in terms of dyn./cm.$^2$ must be divided by the unit of length in order to obtain the force.

The force K, according to Equation 1, therefore determines the pressure gradient at a certain point.

Submerged resistor induction furnaces for the successful operation of the invention are illustrated by way of example in the attached drawings.

Fig. 1 to Fig. 4 show vertical sectional elevations of several forms of furnaces constructed in conformity with this invention.

Figures 5 to 9 are schematical views to support the matematical explanation upon which the invention is based.

Figure 3:
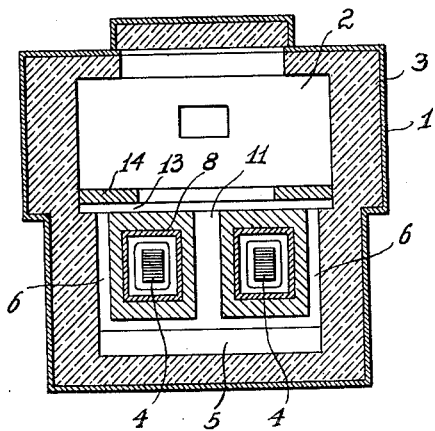

The furnace shown in Fig. 1 comprises a hearth 2 and a secondary loop composed of bottom channel 5 and vertical melting channels 6; the furnace is surrounded by a casing 1 which is provided with a refractory lining 3. The secondary loop is threaded by a primary composed of iron core 4 and coil 9 which is insulated by an asbestos sleeve 8.

The cross area of the vertical melting channels 6 is slightly tapered in an upward direction; maximum forces and correspondingly maximum pressure gradients are created in the upper end sections 7 where the slag particles are concentrated and where they are caused to strongly adhere to the inside walls of the melting channels; the upper end sections 7 may be made cylindrical to facilitate the cleaning thereof.

These zones of maximum force are easily accessible from above. The slags may be removed from the same continuously or intermittently by the introduction of tubular cleaning tools of gradually increasing diameter, which cut out accordingly shaped slag rings. The melting channels are thereby kept free for the full passage of the current. If reconditioning of the melting channels is needed, it can be easily carried out.

In the horizontal channel 5 which has a large cross-section compared with the vertical channels and correspondingly lower pressure gradients no accumulation, concentration or deposition of slags occurs in spite of greatly extended periods of furnace operation, because these slags, which due to the insufficient magnitude of the electromagnetic pressure gradients produced in this channel do not adhere to the walls thereof, are carried therefrom by the flow velocity of the conductor and concentrated in the vertical channels 6 where high magnitude pressure gradients prevail.

This phenomenon is astounding in submerged resistor type induction furnaces provided with vertical and horizontal melting channels as hitherto experience has proven that the slags tend to deposit and to accumulate in furnaces of this type in the horizontal melting channel only; this channel therefore had to be cleaned which necessitates the previously mentioned tiresome and expensive stoppages of the furnace operation.

It is obvious from the explanation given above that the full advantage of the invention can best be materialized in a submerged resistor type induction furnace where the secondary loop is composed of a substantially horizontal bottom channel and a plurality of substantially straight vertical melting channels connecting the hearth with the bottom channel. The ratio of the cross area of the bottom channel 5 to the next adjacent cross area 10 of the vertical channels 6 may be preferably maintained at about 3:1.

The furnace embodied in Fig. 2 of the drawings is different from the one shown in Fig. 1 of the drawings insofar as three vertical melting channels of preferably circular shape, viz. a central channel 11 and two lateral channels 6 are used; corresponding elements of the furnace are designated with same numerals as in Fig. 1.

In the modification of the invention shown in Fig. 3 baffle plates 14 of a refractory material are located on top of the vertical melting channels 6. The zones of maximum hydrostatic pressure gradients are chiefly located in the passages 13 between the baffle plates 14 and the bottom of the hearth. In order to clean the furnace the plates may be lifted whereby the passages 13 are made easily accessible.

Figure 4:
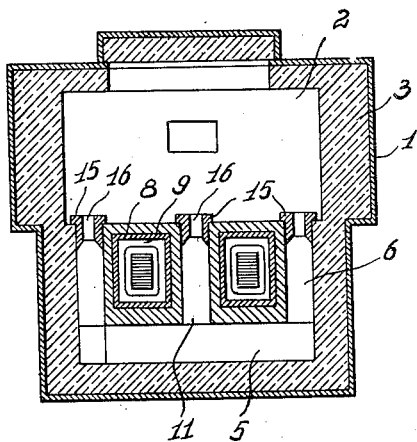

In the furnace shown in Fig. 4 inserts 15 are located in upper end sections of the vertical melting channels 6. The central passages 18 provided in these inserts signify the slag concentrating zones of maximum electromagnetic pressure gradients.

In carrying out this invention the vertical channels may be cleaned from adhering slags or dross by using tubular straight tools of steel; preferably heat resisting steel having the same shape as the melting channels. It is advisable to use several sets of tools, one fitting exactly to the full cross section of the channels and the others having slightly smaller cross sections, and to use the smallest tool first and the larger ones subsequently. The slags are caught at the inside of these tubular tools. This cleaning operation may be performed while the furnace is fully charged.

The invention has been described with particular reference to the melting of light metals and light metal containing alloys.

Alloys, such as for instance aluminum bronzes and copper-aluminum silicon alloys may also be successfully molten according to this invention.

Due to the complete separation of the suspended slag particles from the melt superior castings are obtained by the use of the present furnace.

The invention is in no way restricted to the furnace and melting channel structures shown to illustrate the principles upon which the same is based and many modifications may become evident to those skilled in the art to obtain part or all of the benefits of the invention; therefore, we claim all such furnace structures insofar as they fall within the reasonable spirit and scope of the invention.

Having thus described the same what we claim as new is:

1. A submerged resistor type induction furnace for melting metals comprising in a casing an upper melting hearth, a secondary loop underneath the said melting hearth, a transformer assembly threading the secondary loop, the said loop including a plurality of melting channels so arranged that the flow direction of the molten conductor during the transition from one channel into a second melting channel is abruptly changed, zones in a part of the melting channels easily amenable by cleaning tools from above, said zones having a reduced cross area to create therein by the combined action of a high current density and the resulting electromagnetic fields electromagnetic pressure gradients of a magnitude to cause slag particles suspended in the melt to be pasted to the zone walls whereby the slags may be easily removed from the said walls while maintaining the furnace in operation.

2. A submerged resistor type induction furnace for melting metals comprising in a casing an upper melting hearth, a secondary loop underneath the said melting hearth, a transformer assembly threading the secondary loop, the said loop including a plurality of substantially vertical and a substantially horizontal melting channel, zones in the said vertical melting channels easily amenable by cleaning tools from above, said zones having a reduced cross area to create therein by the combined action of a high current density and the resulting electromagnetic fields electromagnetic pressure gradients of a magnitude to cause slag particles suspended in the melt to be pasted to the zone walls whereby the slags may be easily removed from the said walls while maintaining the furnace in operation.

3. A submerged resistor type induction furnace for melting metals comprising in a casing an upper melting hearth, a secondary loop underneath the said melting hearth, the said loop including two types of melting channels, the first type being easily amenable to cleaning tools from above and having a reduced cross area to create by the combined action of high current density and the resulting electromagnetic fields electromagnetic pressure gradients of a magnitude to cause the slag particles suspended in the melt to adhere to the channel walls, the second type melting channel difficultly amenable to cleaning tools from above having an enlarged cross area to exclude due to the insufficient magnitude of the therein created electromagnetic pressure gradients and due to the flow force of the molten conductor a deposition of the slag particles at its walls.

4. A submerged resistor type induction furnace for melting metals comprising in a casing an upper melting hearth, a secondary loop underneath the said melting hearth, the said loop including two types of melting channels so arranged that the flow direction of the molten conductor from the one type melting channels into the second type melting channel and from the latter into the first type of melting channels is abruptly changed, the first type being easily amenable to cleaning tools from above and having a reduced cross area to create by the combined action of high current density and the resulting electromagnetic fields electromagnetic pressure gradients of a magnitude to cause the slag particles suspended in the melt to adhere to the channel walls, the second type melting channel difficultly amenable to cleaning tools from above having an enlarged cross area to exclude due to the insufficient magnitude of the therein created electromagnetic pressure gradients and due to the flow force of the molten conductor a deposition of the slag particles at its walls.

5. A submerged resistor type induction furnace for melting metals comprising in a casing an upper melting hearth, a secondary loop underneath the said melting hearth, a transformer assembly threading the secondary loop, the said loop including a plurality of substantially vertical and a substantially horizontal melting channel so arranged that the flow direction of the molten conductor during the transition from one channel into a second melting channel is abruptly changed, zones in the said vertical melting channels easily amenable to cleaning tools from above, said zones having a reduced cross area to create therein by the combined action of a high current density and the resulting electromagnetic fields electromagnetic pressure gradients of a magnitude to cause the slag particles suspended in the melt to adhere to the channel walls in the form of a paste, the substantially horizontal melting channel being difficultly amenable to cleaning tools from above having an enlarged cross area to exclude due to the insufficient magnitude of the therein created electromagnetic pressure gradients and due to the flow force of the molten conductor a deposition of the slag particles at its walls.

6. A submerged resistor type induction furnace for melting metals comprising in a casing an upper melting hearth, a secondary loop underneath the said melting hearth, the said loop including two types of melting channels, the first type being easily amenable to cleaning tools from above and having a reduced cross area to create by the combined action of a high current density and the resulting electromagnetic fields electromagnetic pressure gradients of at least a magnitude of $j^2D = 3.10^6$ to cause the slag particles suspended in the melt to adhere to the channel walls, the second type melting channel being difficultly amenable to cleaning tools from above having an enlarged cross area to exclude due to the insufficient magnitude of the therein created electromagnetic pressure gradients and due to the flow force of the molten conductor a deposition of the slag particles at its walls.

7. A submerged resistor type induction furnace for melting metals comprising in a casing an upper melting hearth, a secondary loop underneath the said melting hearth, a transformer assembly threading the secondary loop, the said loop including a plurality of substantially vertical and a substantially horizontal melting channel so arranged that the flow direction of the molten conductor during the transition from one channel into a second melting channel is abruptly changed, zones in the said vertical melting channels easily amenable to cleaning tools from above, said zones having a reduced cross area to create therein by the combined action of a high current density and the resulting electromagnetic fields electromagnetic pressure gradients of at least a magnitude of $j^2D = 3.10^6$ to cause the slag particles suspended in the melt to adhere as a paste to the channel walls, the substantially horizontal melting channel being difficultly amenable to cleaning tools from above having an enlarged cross area to exclude due to a maximum magnitude of $j^2D = 0.6 \times 10^6$ of the therein created electromagnetic pressure gradients and due to the flow force of the molten conductor a deposition of the slag particles at its walls.

8. In an induction furnace according to claim 3 the first type melting channels extending in a substantially vertical direction and having an upwardly tapered cross area.

9. In an induction furnace according to claim 3 the first type melting channels consisting of three channels extending in a substantially vertical direction, the center channel having a substantially equal cross area and the two side channels having an upwardly tapered cross area, the second type channel extending in a substantially horizontal direction and being connected with all three first type melting channels.

10. In a furnace according to claim 3 the ratio of the cross areas of the second type substantially horizontal melting channel to the next adjacent cross area of the first type substantially vertical melting channels being about 3:1.

11. In a furnace according to claim 2 the slag collecting zones having a uniform smallest cross area and being located at the upper ends of the substantially vertical upwardly tapered melting channels.

12. In a furnace according to claim 2 the slag collecting zones being formed of substantially refractory bodies removably inserted into the upper ends of the substantially vertical melting channels, said bodies having inner cylindrical center passages.

13. In a furnace according to claim 1 the amenable parts of the melting channels having a circular cross section.

14. A submerged resistor type induction furnace for melting metals comprising in a casing an upper melting hearth, a secondary loop underneath the said melting hearth, the said loop including two types of melting channels, the first type being easily amenable to cleaning tools from above and having a circular reduced cross area to create by the combined action of high current density and the resulting electromagnetic fields electromagnetic pressure gradients of a magnitude to cause the slag particles suspended in the melt to adhere to the channel walls, the second type melting channel difficultly amenable to cleaning tools from above having an enlarged cross area to exclude due to the insufficient magnitude of the therein created electromagnetic pressure gradients and due to the flow force of the molten conductor a deposition of the slag particles at its walls.

15. In a submerged resistor type induction furnace a secondary having a bottom portion and lateral portions connecting said bottom portion with the hearth, the bottom portion having a sufficiently large cross area to prevent at a given current density the deposition of non metallic components and to thereby maintain their suspension in the flow of the melt.

MANUEL TAMA.
MARIO TAMA.